United States Patent [19]

Fisher et al.

[11] 4,278,952

[45] Jul. 14, 1981

[54] QUANTIZED ANGLE MODULATOR

[76] Inventors: Charles B. Fisher, 2850 Hill Park Rd., Montreal, Quebec H3H 1T1; Sidney T. Fisher, 53 Morrison Ave., Mt. Royal, Montreal, Quebec H3R 1K3, both of Canada

[21] Appl. No.: 171,534

[22] Filed: Jul. 23, 1980

[51] Int. Cl.³ .............................................. H03C 3/02
[52] U.S. Cl. .................................... 332/1; 332/23 R; 455/110
[58] Field of Search ................. 332/1, 16 R, 16 R, 21, 332/23 R; 455/42, 110

[56] References Cited

U.S. PATENT DOCUMENTS

| 4,063,196 | 12/1977 | Larson et al. | 332/21 X |
| 4,179,672 | 12/1979 | Voles | 332/26 X |
| 4,205,241 | 5/1980 | Fisher et al. | 332/23 R X |

OTHER PUBLICATIONS

Tranmission Systems for Communications, Bell Telephone Laboratories, 1971, pp. 116-122, 139-145, 215-219, 426-430, 483-486, 553-578, 583, 589, 592, 594, 608, 626, 627, 646-651, 666-673.
Bell Laboratories Record, Aug. 1972, pp. 229-231.
Bell Laboratories Record, Sep. 1973, pp. 243.
Prigozy, Electronics, Apr. 19, 1969, p. 91.
Reference Data for Radio Engineers, H. W. Sams, 1969, pp. 2-11 to 2-18, 21-13, 21-14, 30-21, 30-22, 38-1 to 38-3.
Bennett, Pulse Code Modulation, London 1976, pp. 23-28.

Primary Examiner—Siegfried H. Grimm

[57] ABSTRACT

A first stream of digits is converted to a second stream of alternating-current digits, each of the same amplitude and the same duration which may be different from the duration of the digits of the first stream, and which transmits at least the information in the first stream of digits at at least the same information rate. A number of alternating-current sources with different frequencies, the number at least as great as the greatest possible number of materially different groups of digits in the first stream, are connected one at a time to an output circuit in response to the first stream of digits to generate the second stream of alternating-current digits. The resultant wave may be limited at non-regenerative repeaters to remove amplitude noise, and may be regenerated in regenerative repeaters to remove substantially all noise and distortion.

4 Claims, 2 Drawing Figures

QUANTIZED ANGLE MODULATOR

BACKGROUND OF THE INVENTION

This invention relates to modulators for producing an angle-modulated wave of great precision which has advantageous transmission characteristics.

Angle modulators of the prior art use non-linear devices, or quantized waves which are not phased and timed for minimum transient disturbance. Waves produced by the modulator of this invention are modulated with precision, cause minimum transient disturbance, and may be transmitted through nonregenerative repeaters with limiters to remove amplitude noise, and pass through regenerative repeaters to remove substantially all noise. This modulator can produce a stream of digits with lower quantization noise and narrower bandwidth, compared to an equivalent PCM system.

We do not know of any relevant prior art.

BRIEF DESCRIPTION OF THE INVENTION

An angle modulator which receives a first stream of digits which are grouped in groups of equal duration; each group is decoded and recoded as a digital word which causes one of a plurality of alternating-current generators to be connected to an output circuit. Each generator has a unique frequency, materially different from the frequency of any other generator in the plurality, and the number of generators is at least as great as the greatest possible number of materially different groups of digits in the first stream. Alternating-current generators are connected to the output circuit by timing and connecting means which minimize transient disturbance. The first stream of digits may be derived from sampling a number of analog samples, at greater than the Nyquist rate, and interleaving the samples to provide multichannel transmission. The wave produced by the modulator may be passed through non-regenerative repeaters with amplitude-limiting circuits to remove amplitude noise, and may be amplitude limited and regenerated in regenerative repeaters to remove substantially all noise.

DETAILED DESCRIPTION OF THE INVENTION

In this disclosure many of the substantiating data are drawn from Transmission Systems for Communications, Bell Telephone Laboratories 1971, hereinafer designated as Ref. 1. Bennett Pulse Code Modulation, London 1976, is hereinafter designated Ref. 2.

Figure 1:
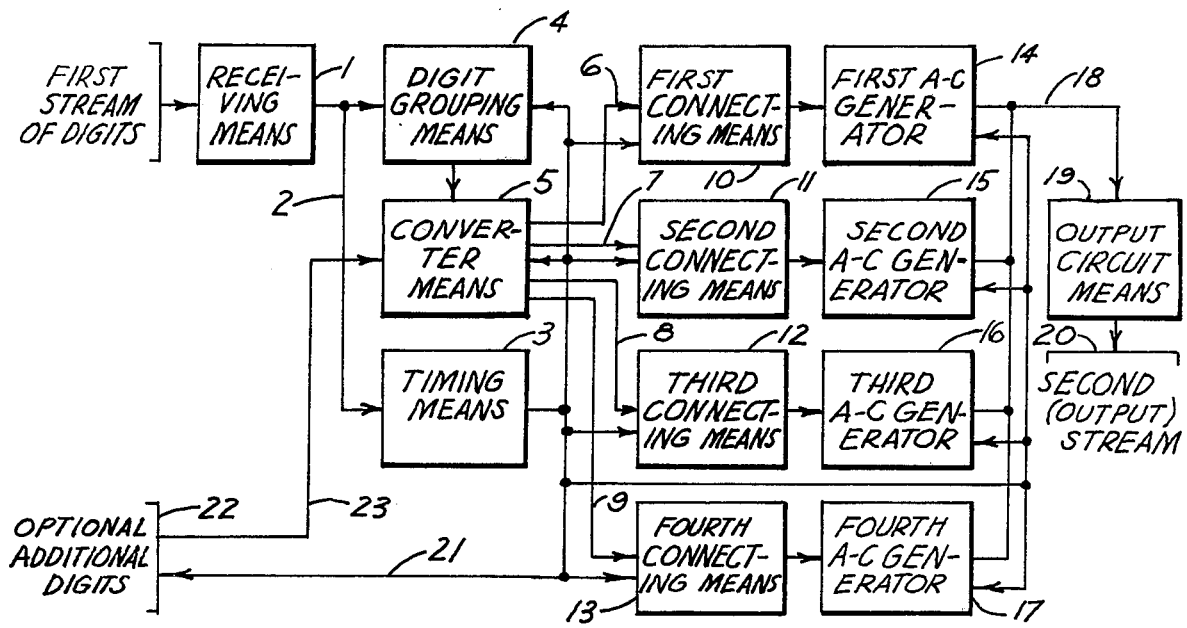
FIG. 1 shows a quantized angle modulator receiving a first stream of digits, and delivering a corresponding second stream of alternating-current digits.

FIG. 1 shows in simplified block schematic form a quantized angle modulator according to the invention, which receives a first stream of digits from a source and delivers a corresponding stream of alternating-current digits, with optional additional digits supplied from another source which can be used for signalling, supervisory, framing, cancellation of digits in the first stream, or other purposes.

Receiving means 1 of a first stream of digits delivers these digits over lead 2 to timing means 3 and digit grouping means 4. These digits may be of well-known types normally used to transmit information, such as binary unipolar, binary bipolar, ternary, samples of quantized amplitudes, as shown in Ref. 1, pages 119,141,554, 558, 559, 562, 569, 667, 669, 670 and in Ref. 2, page 24, or alternating-current digits with quantized frequencies as produced by the modulator of this invention.

Timing means 3 is a well-known device which extracts timing information from the first stream of digits and uses such information to control the timing of other elements of FIG. 1 (lead 21). Such timing means is shown in Ref. 1, pages 626 and 627 and page 559 (synchronization discussion).

Digital grouping means 4 is a well-known logic device, controlled in timing by timing means 3, which counts off a predetermined number of digits on lead 2 and releases them as a group or digital word to converter means 5, as described in other terms in Ref. 1, pages 558, 559 and 583 (word-at-a-time coding).

Digital converter means 5 is a well-known device which in effect denodes an incoming first stream of digits, is controlled by timing means 3, and produces an outgoing stream of digits differently encoded, conveying the same information, with information added or subtracted in some cases. The prior art is described in Ref. 1, pages 666, 667, 668, 669, 670, 671, 672 and 673. The optional use of additional information from source 22 over lead 23 is shown in the prior art at page 667, lines 12, 13, and 14. This additional information is considered part of the first stream of digits and is coordinated in timing with timing means 3. See also Ref. 1, pages 589, 592 and 594.

Digital converter means 5 has a plurality of output leads, of which four are shown designated 6,7,8 and 9 respectively. Digital converter 5 also receives a timing wave from timing means 3. For each group of digits received from grouping means 4, with materially different information content, digital converter 5 activates a different one of the plurality of output leads. Each output lead, of which 6,7, 8 and 9 are shown, actuates one of a plurality of connecting means, four of which are shown designated 10, 11, 12 and 13. Each connecting means completes a circuit through one of a plurality of alternating-current generators controlled in frequency and phase by timing means 3, four of which are shown, designated 14,15,16 and 17, to a common output lead 18.

Connecting means 10,11,12 and 13 may be switches which close when the associated digital converter output lead is activated, for example by connection to a common ground. Closing and opening of each connecting means may be timed to take place only at peaks of one polarity of the associated alternating-current generator, in order to minimize transient disturbances, that result in interdigit interference on output lead 18. Connecting means 10,11,12 and 13 may also include networks containing passive, active or both passive and active elements, in order to minimize interdigit interference. A theoretical basis for the design of such networks is discussed in Ref. 1, pages 646,647, 648, 650, and 651.

The function of digital converter 5 in encoding each different group of digits or digital word received from digit grouping means 4, as a predetermined frequency of alternating current, is closely parallel to the PCM line coding problem discussed in Ref. 1, pages 666 to 673 inclusive.

Output lead 18 may carry the quantized angle-modulated output wave through a band-limiting filter, an equlizer, an output transformer or other elements of output circuit means 19, to deliver a stream of alternating-current digits, each of which constitutes a digital word, to lead 20. A discussion of the angle-modulated wave is given in Ref. 1 at pages 115 and 426 to 430 inclusive. Pre-emphasis may be used in circuit 19, as discussed in Ref. 1, pages 483, 484, 485 and 486.

Digital converter 5 may use companding as discussed in Ref. 1, pages 574 to 578 inclusive. Converter 5 may also use well-known zero-crossing indicator circuits. Sampling, holding, encoding and decoding circuits used with direct-current digits such as may constitute the first stream of digits are shown in Ref. 2, pages 23 to 28 inclusive.

The highest frequency of the alternating-current generators is less than twice the lowest frequency, so that after subsequent non-linear processing the output 20 cannot generate spurious digits from the output stream which are harmonics, sums and differences of the frequencies of the alternating-current generators and which substantially coincide with the frequency of one or more of the alternating-current generators.

This invention is useful, over PCM systems of the prior art, since the output stream of digits may be amplitude limited and may be regenerated substantially free from error, despite superimposed noise. The utility and theory of regeneration is discussed in Ref. 1, pages 215 to 219 inclusive, 626 and 627, and in the Bell Laboratories Record, Sept. 1973, page 243.

Figure 2:
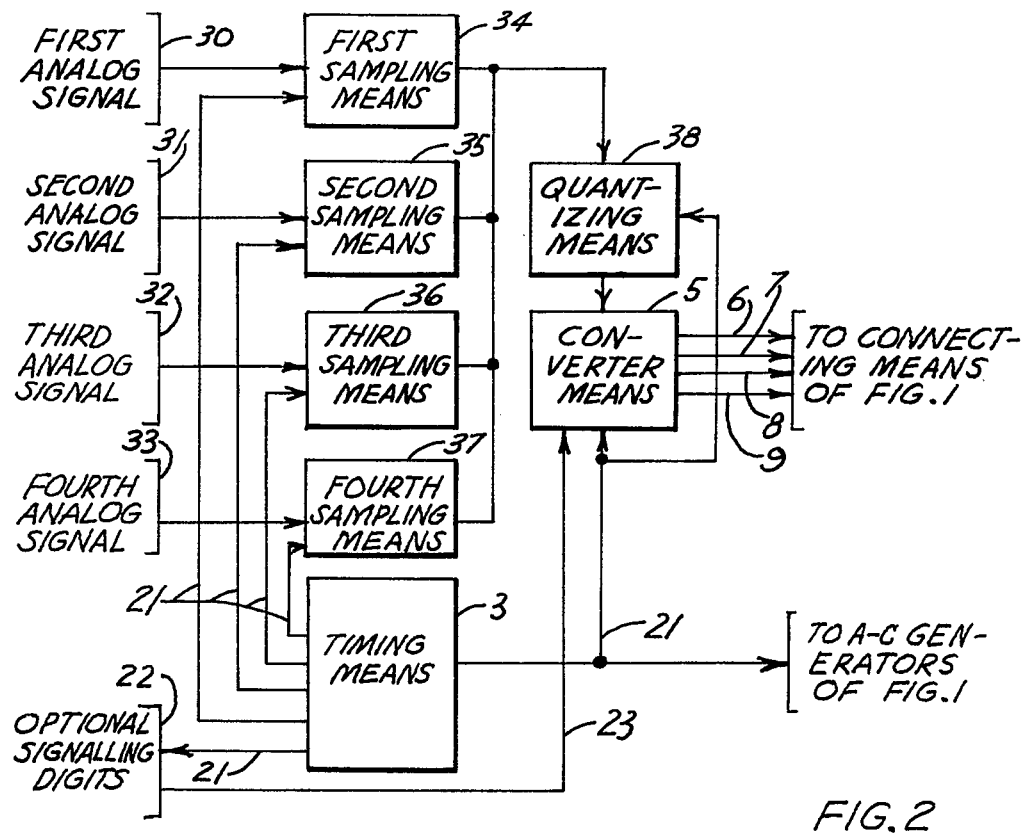
FIG. 2 shows a plurality of analog wave sources which are sampled, quantized, and the quantized samples interleaved to produce a multiplexed stream of direct-current digits, each of which is converted to an alternating-current pulse of a predetermined frequency, and transmitted as one of a stream of alternating-current digits, each equivalent to a digital word.

FIG. 2 shows in a simplified block schematic diagram a portion of a quantized amplitude modulator according to the invention, which receives amplitude samples from a plurality of analog signal sources, and digits from a source of optional additional digits for signalling and other purposes. First, second, third and fourth analog signal sources 30, 31, 32 and 33 are each sampled by well-known sampling means 34, 35, 36 and 37 (Ref. 1, pages 116, 117, 118, and 119, 139 to 145, 560, 562 to 570 and Ref. 2, pages 23 to 28), controlled by timing means 3 over leads 21. The outputs of sampling means 34,35,36 and 37 are quantized to a predetermined number of discrete amplitudes by well-known methods in quantizing means 38 (See Ref. 1, pages 120, 121, 122, 570, 571, 572 and 573), with timing controlled by timing means 3. The output of quantizing means 38 and the digits from the source of optional additional digits 22, controlled by timing means 3, and appearing on lead 23, are delivered to digital converter means 5, already described under FIG. 1.

The output of digital converter means 5 is delivered over leads 6,7,8,9 and 10 as already shown and described in FIG. 1.

The output wave of FIGS. 1 and 2 comprises a digital quantized angle-modulated wave. This wave may be passed through an amplitude limiter to be freed from substantially all varying-amplitude noise, and may be received by appropriate apparatus which identifies the frequency of each digit (which is equivalent to a digital word), and regenerates precisely the original frequency emitted by one of the alternating-current generators of FIG. 1, thus substantially eliminating frequency-variation noise.

We claim:

1. A quantized angle modulator for receiving a first stream of digits of substantially the same duration, which converts said first stream of digits to a second stream of alternating-current digits each of substantially the same peak amplitude and each of substantially the same duration which may be different from said duration of the digits of said first stream, said second stream of alternating current digits transmitting the information of said first stream of digits, which comprises:

receiving means for said first stream of digits, and
grouping means connected to said receiving means for grouping said first stream of digits into groups or digital words of substantially equal duration, each said group containing an integral number of said digits of said first stream;
a plurality of alternating-current generators, each of which generates a wave of substantially the same peak amplitude with a single substantially constant frequency, the frequencies of the waves from any two generators being materially different, the number of said generators being at least as great as the greatest possible number of said groups of digits with materially different information content;
digital converter means which receives said groups of digits from said grouping means, and causes one of said generators to be connected through connecting means to a single output circuit for all said generators after the receipt of each of said groups, a different one of said generators being connected for each of said groups with materially different information content according to a predetermined coding plan; and
timing means which produces a wave with predetermined fixed frequency and phase relationship to the timing of said first stream of digits, said wave controlling the timing of said grouping means and said converter means and the frequencies and phases of said alternating-current generators.

2. A quantized angle modulator according to claim 1 in which said first stream of digits is produced by amplitude sampling means for each of one or more analog waves, said digits from different waves of said analog waves and from a source of additional digits being interleaved in a regular manner, with the duration of said digits restricted and the timing of said digits adequate, so that no material interdigit interference occurs, each said analog wave being sampled at a frequency greater than the Nyquist frequency for said analog wave.

3. A quantized angle modulator in accordance with claim 1, in which each of said alternating-current generators produces substantially an integral number of cycles during the duration of one group, and said connecting means connects and disconnects each of said generators to and from said output circuit substantially at instants of peaks of the same polarity.

4. A quantized angle modulator in accordance with claim 1 in which each of said connecting means for each of said alternating-current generators to said output means comprises a network
which minimizes the interference between alternating-current digits.

* * * * *